United States Patent
Lee

(10) Patent No.: US 10,339,370 B2
(45) Date of Patent: Jul. 2, 2019

(54) METHOD AND APPARATUS FOR DETERMINING OBSTACLE COLLISION BY USING OBJECT MOVING PATH

(71) Applicant: HANWHA DEFENSE CO., LTD., Changwon-si (KR)

(72) Inventor: JinHan Lee, Changwon-si (KR)

(73) Assignee: HANWHA DEFENSE CO., LTD., Changwon-si (KR)

(*) Notice: Subject to any disclaimer, the term of this patent is extended or adjusted under 35 U.S.C. 154(b) by 114 days.

(21) Appl. No.: 15/360,355

(22) Filed: Nov. 23, 2016

(65) Prior Publication Data

US 2017/0169288 A1    Jun. 15, 2017

(30) Foreign Application Priority Data

Dec. 11, 2015    (KR) .................. 10-2015-0177369

(51) Int. Cl.
| | |
|---|---|
| *G06K 9/00* | (2006.01) |
| *G06K 9/46* | (2006.01) |
| *G06K 9/52* | (2006.01) |
| *B25J 9/16* | (2006.01) |
| *G05D 1/02* | (2006.01) |

(52) U.S. Cl.
CPC ........ *G06K 9/00335* (2013.01); *B25J 9/1666* (2013.01); *G05D 1/0274* (2013.01); *G06K 9/4604* (2013.01); *G06K 9/52* (2013.01); *G05B 2219/39091* (2013.01); *G06K 9/00664* (2013.01); *G06K 9/00805* (2013.01)

(58) Field of Classification Search
CPC .... G06K 9/00335; G06K 9/4604; G06K 9/52; G06K 9/00664; G06K 9/00805; B25J 9/1666; G05D 1/0274; G05B 2219/39091
See application file for complete search history.

(56) References Cited

U.S. PATENT DOCUMENTS

| | | | |
|---|---|---|---|
| 9,333,652 B2 * | 5/2016 | Hu | .................... G06K 9/00355 |
| 2004/0249809 A1 | 12/2004 | Ramani et al. | |
| 2015/0169979 A1 | 6/2015 | Ko et al. | |
| 2015/0251315 A1 * | 9/2015 | Brandenberger | ...... B25J 9/1676 700/255 |
| 2016/0207198 A1 * | 7/2016 | Willfor | .............. G05B 19/4061 |
| 2017/0072850 A1 * | 3/2017 | Curtis | ............... B60W 50/0097 |

FOREIGN PATENT DOCUMENTS

| | | |
|---|---|---|
| KR | 10-2010-0070582 A | 6/2010 |
| KR | 10-2015-0071781 A | 6/2015 |

* cited by examiner

*Primary Examiner* — Shefali D Goradia

(74) *Attorney, Agent, or Firm* — Sughrue Mion, PLLC

(57) ABSTRACT

A method of determining obstacle collision by using an object moving path includes: acquiring a topological skeleton corresponding to a path area on an image including a moving path of an object and an obstacle; determining, from among skeleton points forming the topological skeleton, branch points that are interconnecting points between branches of the topological skeleton; determining a target branch from among the branches by using the branch points; selecting, from among points forming the target branch, a plurality of target points to determine whether the moving path is a collision path of the object; and determining whether the moving path is the collision path by using the target points.

20 Claims, 13 Drawing Sheets

METHOD AND APPARATUS FOR DETERMINING OBSTACLE COLLISION BY USING OBJECT MOVING PATH

CROSS-REFERENCE TO THE RELATED APPLICATION

This application claims priority from Korean Patent Application No. 10-2015-0177369, filed on Dec. 11, 2015, in the Korean Intellectual Property Office, the disclosure of which is incorporated herein in its entirety by reference.

BACKGROUND

1. Field

Apparatuses and methods consistent with exemplary embodiments relate to determining obstacle collision by using an object moving path, and more particularly, to determining obstacle collision by using a topological skeleton of an object moving path.

2. Description of the Related Art

In order to create an optimum moving path for an object such as a moving robot along which the object does not collide with any obstacle, it may be required to predetermine whether the object will collide with an obstacle on the moving path and a distance between the object and the obstacle.

SUMMARY

One or more exemplary embodiments provide a method and apparatus for determining obstacle collision by using an object moving path, whereby topological skeleton points in a path area are used to determine the obstacle collision, thereby reducing the number of operations necessary for determining obstacle collision in comparison to the case when all points in the path area are used.

One or more exemplary embodiments provide a method and apparatus for determining obstacle collision by using an object moving path, whereby only some points of a topological skeleton based on a determined error value are selected, a path area is modeled, and the modeled path area is used to determine the obstacle collision so as to adjust a modeling error and operation reduction effects according to the modeling error.

Various aspects will be set forth in part in the description which follows and, in part, will be apparent from the description, or may be learned by practice of the presented exemplary embodiments.

According to one or more embodiments, there is provided a method of determining obstacle collision by using an object moving path. The method may include: acquiring a topological skeleton corresponding to a path area on an image including a moving path of an object and an obstacle; determining, from among skeleton points forming the topological skeleton, branch points that are interconnecting points between branches of the topological skeleton; determining a target branch from among the branches by using the branch points; selecting, from among points forming the target branch, a plurality of target points to determine whether the moving path is a collision path of the object; and determining whether the moving path is the collision path by using the target points.

The selecting the target points may include: creating a filling circle for each of the target points, the filling circle having the each of the target points as a center and a shortest distance between a boundary of the path area and the each of the target points as a radius; calculating error values for the each of the target points by using the filling circles; and selecting target points such that the error value is less than a preset error threshold.

The calculating of the error values may include acquiring, for each pair of the target points that do not have another target point in between, two intersections between two filling circles corresponding to the each pair of the target points and two lines that contact the two filling circles, and calculating the error values based on a least value from among distances between the intersections and the lines.

The calculating the error values may include acquiring, for each pair of the target points that do not have another target point in between, two intersections between two filling circles corresponding to the each pair of the target points, and calculating the error values based on a greatest value from among shortest distances between the boundary of the path area and the intersections.

The calculating the error values may include calculating the error values based on the number of points in a portion of the path area which does not overlap the filling circles.

The creating the filling circle may include acquiring a shortest distance between the boundary of the path area and the each of the each of the target points based on a value obtained by Euclidean distance transforming the image based on the boundary of the path area.

The determining whether the moving path is the collision path may include determining whether the moving path is the collision path by comparing, for each of the target points, a shortest distance between a boundary of the path area and the each of the target points with a shortest distance between a boundary of the obstacle and the each of the target points.

The moving path may be determined as the collision path when there is a target point with respect to which the shortest distance between the boundary of the path area and the target point is longer than the shortest distance between the boundary of the obstacle and the target point.

The acquiring the topological skeleton may include acquiring a first median by Euclidean distance transforming the image based on a boundary of the path area; acquiring a second median by detecting feature points from the first median; acquiring a third median by thinning feature points of the second median; and acquiring the topological skeleton by detecting largest connected points from among thinned points of the third median.

The determining the branch points may include: determining, for each of the skeleton points, a neighboring skeleton point in a horizontal or vertical direction as a first neighbor skeleton point; determining another skeleton point not neighboring the first neighbor skeleton point in the horizontal or vertical direction but neighboring the each one of the skeleton points in a diagonal direction as a second neighbor skeleton point; and determining one of the skeleton points having three or more neighboring skeleton points as the branch point.

The determining the target branch may include determining, from among the branches, a branch formed of the greatest number of points as the target branch.

According to one or more embodiments, there is provided an apparatus for determining obstacle collision by using an object moving path which may include: a topological skeleton acquirer configured to acquire a topological skeleton corresponding to a path area in an image including a moving path of an object and an obstacle; a branch point determiner configured to determine, from among skeleton points forming the topological skeleton, branch points that are interconnecting points between branches of the topological skeleton; a target branch determiner configured to determine a target branch from among the branches by using the branch points; a target point selector configured to select, from among points forming the target branch, a plurality of target points to determine whether the moving path is a collision path of the object; and a collision path determiner configured to determine whether the moving path is the collision path by using the target points.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
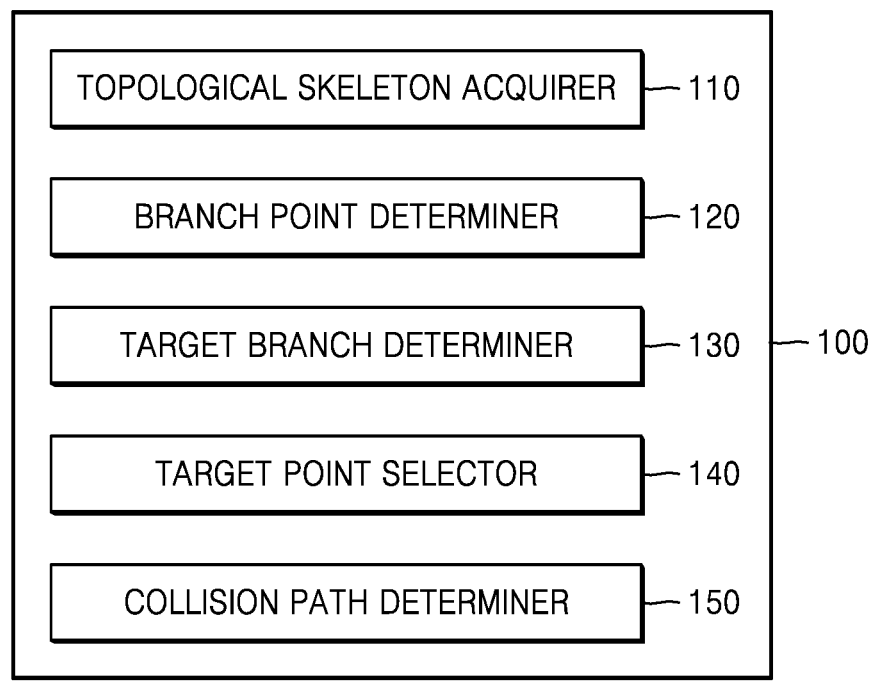
FIG. 1 is a diagram of an apparatus for determining obstacle collision by using an object moving path, according to an exemplary embodiment.

As the inventive concept of the present application allows for various changes, the exemplary embodiments will be illustrated in the drawings and described in detail in the written description. However, this is not intended to limit the inventive concept to particular modes of practice or embodiments, and it will be appreciated that all changes, equivalents, and substitutes that do not depart from the spirit and technical scope of the inventive concept are encompassed in the exemplary embodiments. In the description of the exemplary embodiments, certain detailed explanations of the related art are omitted when it is deemed that they may unnecessarily obscure the essence of the inventive concept. As used herein, the term "and/or" includes any and all combinations of one or more of the associated listed items. Expressions such as "at least one of," when preceding a list of elements, modify the entire list of elements and do not modify the individual elements of the list.

In the description herein, while such terms as "first," "second," etc., may be used to describe various components, such components must not be limited to the above terms. The above terms are used only to distinguish one component from another.

The terms used herein are merely used to describe the exemplary embodiments and are not intended to limit the inventive concept. An expression used in the singular encompasses the expression of the plural, unless it has a clearly different meaning in the context. In the descriptions herein, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The exemplary embodiments may be described in terms of functional block components and various processing steps. Such functional blocks, e.g., FIGS. 1 and 2, may be realized by any number of hardware and/or software components configured to perform the specified functions. For example, the functional blocks may employ various integrated circuit (IC) components, e.g., memory elements, processing elements, logic elements, look-up tables, and the like, which may carry out a variety of functions under the control of one or more microprocessors or other control devices. Similarly, where the elements of the embodiments are implemented using software programming or software elements, embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

In the exemplary embodiments and the accompanying drawings, like reference numerals in the drawings denote like elements, and thus their description will not be repeated FIG. 1 is a diagram of an apparatus 100 for determining obstacle collision by using an object moving path, according to an exemplary embodiment.

Referring to FIG. 1, the apparatus 100 according to an exemplary embodiment may include a topological skeleton acquirer 110, a branch point determiner 120, a target branch determiner 130, a target point selector 140, and a collision path determiner 150. According to an exemplary embodiment, the apparatus 100 may be installed in an object moving along the object moving path. According to another exemplary, the apparatus 100 may be disposed outside the object and configured to communicate with the object in a wired or wireless manner to control the object. The object may be a moving robot, according to an exemplary embodiment.

The topological skeleton acquirer 110 may acquire a topological skeleton that corresponds to a path area on an image including an obstacle and a moving path of an object.

The moving path of the object may be a path area generated when the object moves. The object may have preset horizontal and vertical lengths, and the path area may be a path that has an area with respect to a size of the object.

The object may collide with or avoid the obstacle while moving. The obstacle may be arranged on the image as a line or an area.

The topological skeleton may be a group of points away from a boundary of the path area by an identical distance. For example, the topological skeleton may be a medial axis formed in the path area.

Hereinafter, points on an image forming the topological skeleton are referred to as skeleton points.

The branch point determiner 120 may determine, from among skeleton points that form the topological skeleton, branch points that are interconnecting points between branches of the topological skeleton.

The topological skeleton may be classified as nodes connected to at least two lines and branches connected to the nodes.

Hereinafter, a point on the image and corresponding to a node is referred to as a branch point, a point corresponding to an end point from among points forming a branch is referred to as an end point, and a point other than the end point from among the points forming the branch is referred to as a normal point.

The target branch determiner 130 may determine a target branch from among the branches by using the branch points.

In this case, the target branch determiner 130 may determine a branch formed of the greatest number of points as the target branch.

The target point selector 140 may select, from among points forming the target branch, a plurality of target points for determining whether the moving path is a collision path.

The target point selector 140 may select all or some of the points that form the target branch as the target points.

When the target point selector 140 selects only some of the points that form the target branch as the target points, the target point selector 140 may select the target points such that an error value is less than a preset error threshold. The error value may be a modeling error value of the path area.

For example, the target point selector 140 may select only some of the points that form the target branch as the target points, model a path area by creating a filling circle for each of the target points, and select the target points such that a modeling error value is less than the preset error threshold.

In this case, the target point selector 140 may select more target points and create more filling circles to reduce a modeling error value such that the modeling error value is less than the preset error threshold.

The collision path determiner 150 may determine whether the moving path is the collision path by using the target points.

That is, when there is an obstacle on the moving path, the collision path determiner 150 may determine that the moving path is the collision path.

According to exemplary embodiments, when the collision path determiner 150 determines that the moving path is not the collision path, the collision path determiner 150 may calculate a distance between the object moving along the moving path under control of the apparatus 100 and the obstacle on the moving path as an evaluation index of the moving path.

Figure 2:
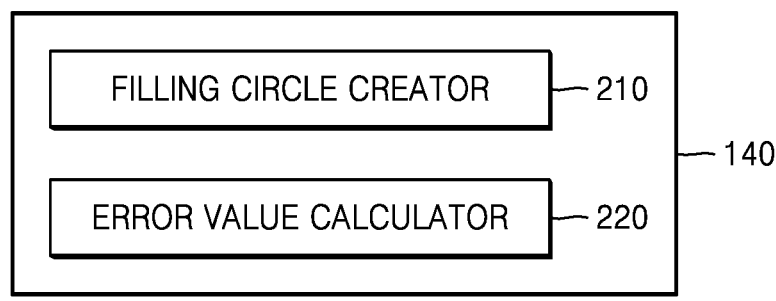
FIG. 2 is an exemplary diagram of a target point selector of FIG. 1, according to an exemplary embodiment.

FIG. 2 is an exemplary diagram of the target point selector 140 of FIG. 1.

Referring to FIG. 2, the target point selector 140 of FIG. 1 includes a filling circle creator 210 and an error value calculator 220.

For each of the target points, the filling circle creator 210 may create a filling circle having the each of the target points as the center and a shortest distance between a boundary of the path area and the each of the target points as a radius.

That is, the filling circle creator 210 may model the path area by creating a filling circle for the each of the target points.

According to exemplary embodiments, the filling circle creator 210 may acquire the shortest distance between the boundary of the path area and the each of the target points based on a value obtained by Euclidean distance transforming the image based on the boundary of the path area, and set the acquired distance as the radius of the filling circle.

The error value calculator 220 may calculate error values by using the filling circles.

According to exemplary embodiments, for each pair of the target points that do not have another target point therebetween, the error value calculator 220 may acquire two intersections between two filling circles corresponding to the each pair of the target points and two lines that simultaneously contact the two filling circles, and calculate the error values based on the least value from among distances between the intersections and the lines.

According to exemplary embodiments, for each pair of the target points that do not have another target point therebetween, the error value calculator 220 may acquire two intersections between two filling circles corresponding to the each pair of the target points, and calculate the error values based on the greatest value from among the shortest distances between the boundary of the path area and the intersections.

According to exemplary embodiments, the error value calculator 220 may calculate the error values based on the number of points included in a portion of a path area which does not overlap the filling circles.

Figure 3:
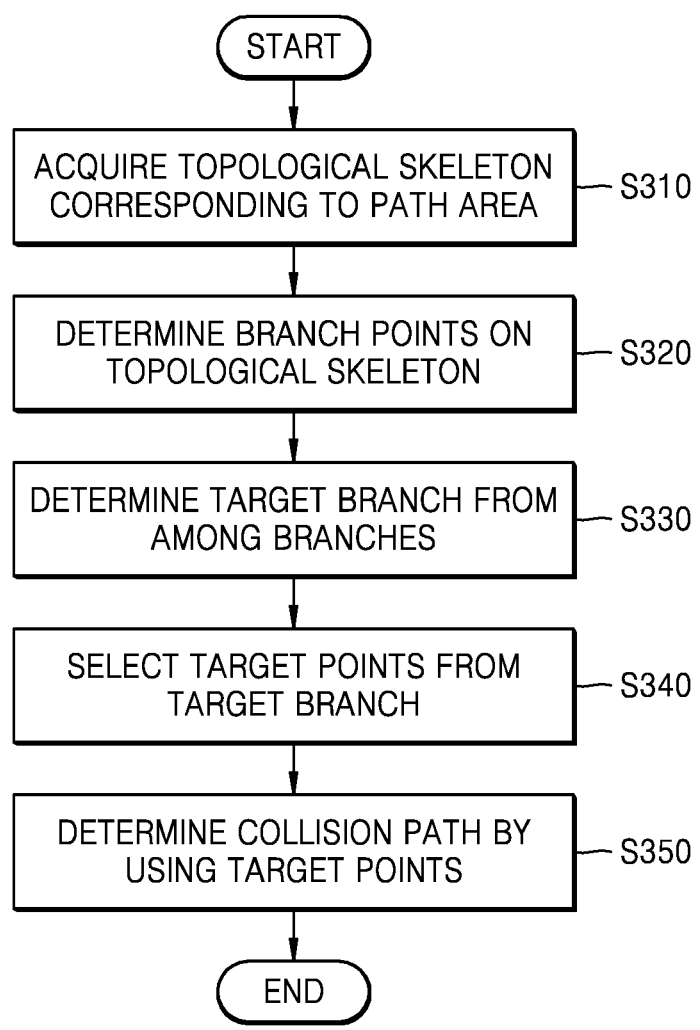
FIG. 3 is a flowchart of a method of determining obstacle collision by using an object moving path, according to an exemplary embodiment.

FIG. 3 is a flowchart of a method of determining obstacle collision by using an object moving path, according to an exemplary embodiment.

Referring to FIG. 3, the method according to an exemplary embodiment includes, operation S310 of acquiring a topological skeleton corresponding to a path area, performed by a topological skeleton acquirer (110 of FIG. 1), operation S320 of determining branch points on the topological skeleton, performed by a branch point determiner (120 of FIG. 1), operation S330 of determining a target branch from among branches, performed by a target branch determiner (130 of FIG. 1), operation S340 of selecting target points from the target branch, performed by a target point selector (140 of FIG. 1), and operation S350 of determining a collision path by using the target points, performed by a collision path determiner (150 of FIG. 1).

First, the topological skeleton acquirer (110 of FIG. 1) acquires a topological skeleton corresponding to a path area on an image including a moving path of an object and an obstacle (S310).

Second, the branch point determiner (120 of FIG. 1) determines, from among skeleton points that form the topological skeleton, branch points that are interconnecting points between branches of the topological skeleton (S320).

Third, the target branch determiner (130 of FIG. 1) determines, a target branch from among the branches by using the branch points (S330).

Fourth, the target point selector (140 of FIG. 1) selects, from among points forming the target branch, a plurality of target points for determining whether the moving path is a collision path (S340).

Lastly, the collision path determiner (150 of FIG. 1) determines whether the moving path is the collision path by using the target points (S350).

Although not shown in FIG. 3, according to an exemplary embodiment, when the collision path determiner (150 of FIG. 1) determines that the moving path is not the collision path, the collision path determiner (150 of FIG. 1) may calculate a distance between the object and the obstacle on the moving path as an evaluation index of the moving path.

Figure 4:
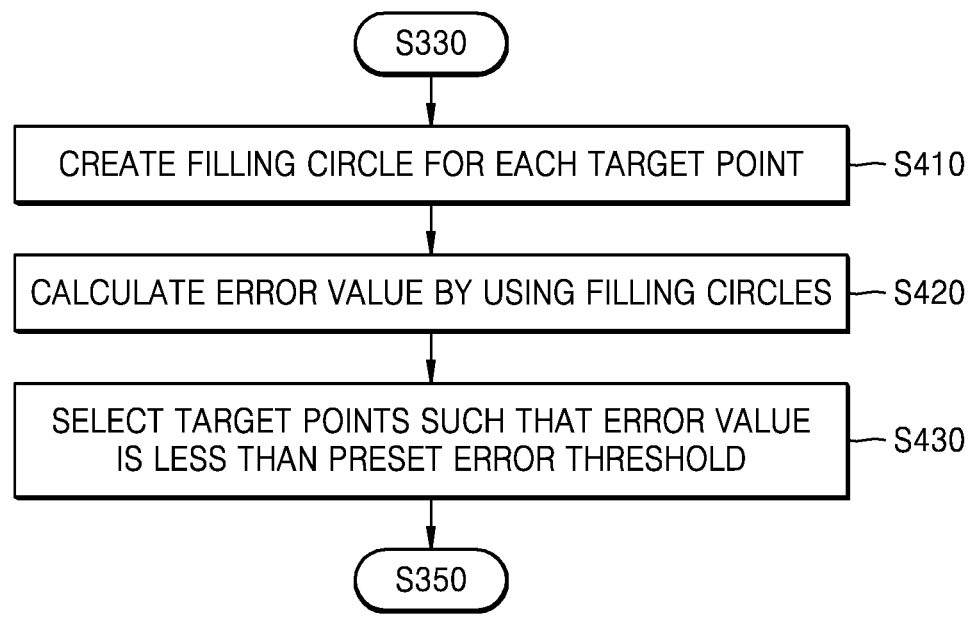
FIG. 4 is an exemplary flowchart for selecting of a target point of FIG. 3, according to an exemplary embodiment.

FIG. 4 is an exemplary flowchart of the selecting of the target point (S340) of FIG. 3.

Referring to FIG. 4, the selecting the target points (S340) of FIG. 3 includes operation S410 of creating a filling circle for each of the target points, performed by a filling circle creator (210 of FIG. 2), operation S420 of calculating an error value for a target point by using the filling circles, performed by an error value calculator (220 of FIG. 2), and operation S430 of selecting target points such that an error value is less than a preset error threshold, performed by the target point selector (140 of FIG. 1).

First, in the selecting the target points (S340) of FIG. 3, for each of the target points, the filling circle creator (210 of FIG. 2) creates a filling circle having a target point as a center and a shortest distance between a boundary of a path area and the target point as a radius (S410).

In operation S410, the filling circle creator (210 of FIG. 2) may acquire the shortest distance between the boundary of the path area and the target point based on a value obtained by Euclidean distance transforming the image based on the boundary of the path area.

Next, in the selecting of the target points (S340) of FIG. 3, the error value calculator (220 of FIG. 2) calculates an error value by using the filling circles (S420).

In operation S420, for each pair of the target points that do not have another target point therebetween, the error value calculator (220 of FIG. 2) may acquire two intersections between two filling circles corresponding to the each pair of the target points and two lines that simultaneously contact the two filling circles, and calculate an error value based on the least value from among distances between the intersections and the lines.

In operation S420, for each pair of target points that do not have another target point therebetween, the error value calculator (220 of FIG. 2) may acquire two intersections between two filling circles corresponding to the pair of target points, and calculate an error value based on the greatest value from among the shortest distances between the boundary of the path area and the intersections.

In operation S420, the error value calculator (220 of FIG. 2) may calculate an error value based on the number of points included in a portion of a path area which does not overlap the filling circles.

Lastly, in the selecting the target points (S340) of FIG. 3, the target point selector (140 of FIG. 1) selects the target points such that an error value is less than a preset error threshold (S430).

Figure 5:
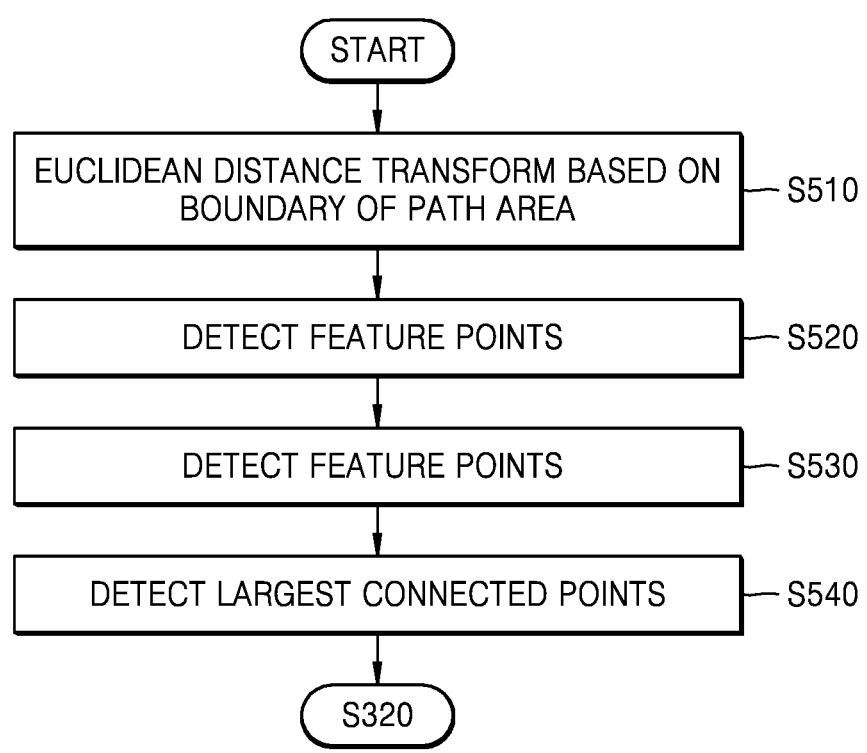
FIG. 5 is an exemplary flowchart for acquiring of a topological skeleton of FIG. 3, according to an exemplary embodiment.

FIG. 5 is an exemplary flowchart of the acquiring the topological skeleton (S310) of FIG. 3.

Referring to FIG. 5, the acquiring the topological skeleton (S310) of FIG. 3 includes operation S510 of Euclidean distance transforming based on the boundary of the path area, performed by the topological skeleton acquirer (110 of FIG. 1), operation S520 of detecting feature points, operation S530 of thinning the feature points, and operation S540 of detecting largest connected points.

First, in the acquiring the topological skeleton (S310) of FIG. 3, the topological skeleton acquirer (110 of FIG. 1) acquires a first median by Euclidean distance transforming the image based on the boundary of the path area (S510).

Second, in the acquiring the topological skeleton (S310) of FIG. 3, the topological skeleton acquirer (110 of FIG. 1) acquires a second median by detecting feature points from the first median (S520).

Third, in the acquiring the topological skeleton (S310) of FIG. 3, the topological skeleton acquirer (110 of FIG. 1) acquires a third median by thinning feature points of the second median (S530).

Fourth, in the acquiring the topological skeleton (S310) of FIG. 3, the topological skeleton acquirer (110 of FIG. 1) acquires the topological skeleton by detecting largest connected points from among thinned points of the third median (S540).

Figure 6:
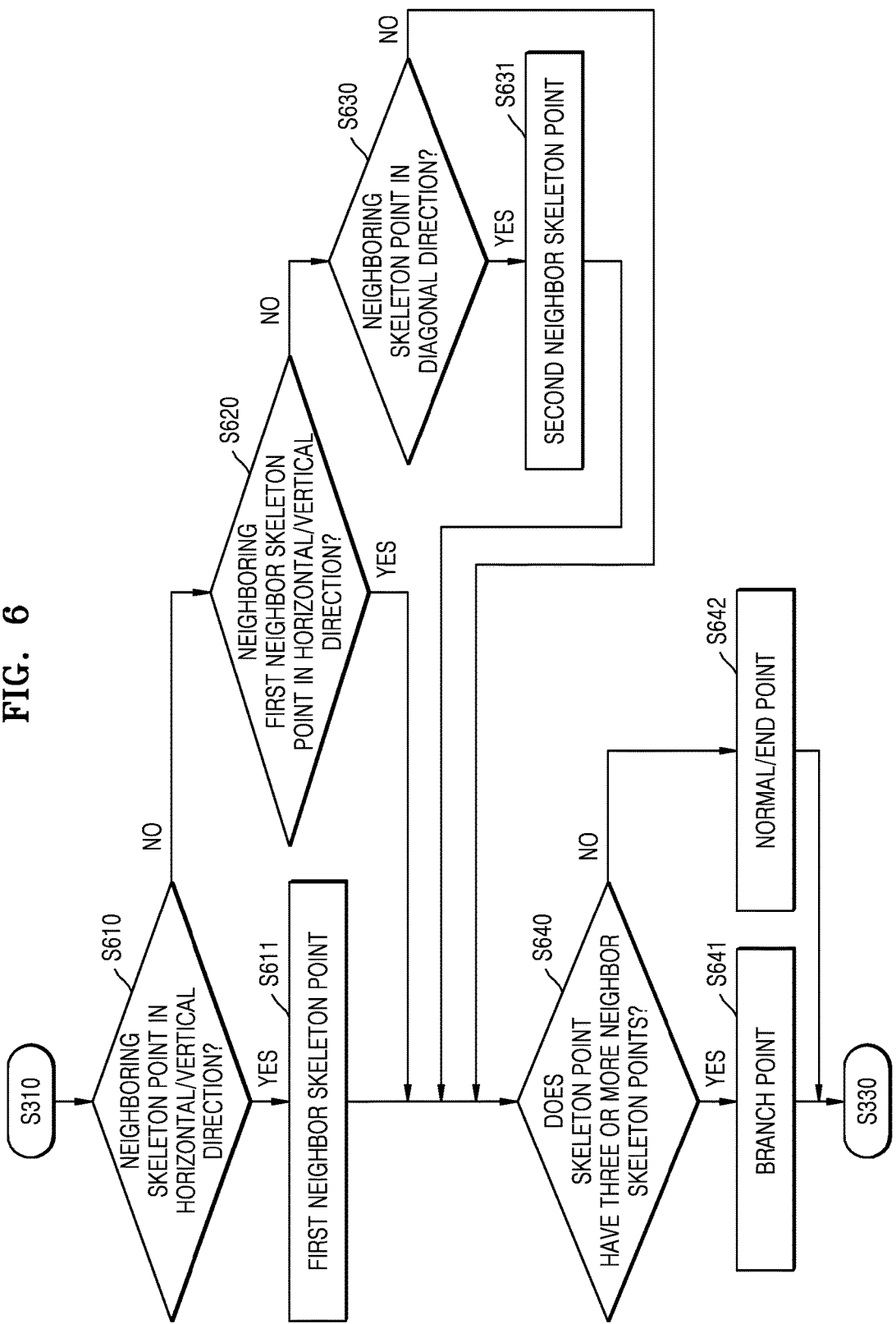
FIG. 6 is an exemplary flowchart for determining of branch points of FIG. 3, according to an exemplary embodiment.

FIG. 6 is an exemplary flowchart of the determining of the branch points (S320) of FIG. 3.

Referring to FIG. 6, the determining the branch points (S320) of FIG. 3 includes, operations S610, S620, and S630, performed by the branch point determiner (120 of FIG. 1), of determining a neighbor skeleton point condition of skeleton points neighboring a skeleton point, and operation S640 of determining whether the skeleton point has three or more neighbor skeleton points based on the determination.

First, in the determining the branch points (S320) of FIG. 3, when a skeleton point is determined as a central skeleton point and another skeleton point that neighbors the central skeleton point is determined as a surrounding skeleton point, the branch point determiner (120 of FIG. 1) determines whether the surrounding skeleton point neighbors the central skeleton point in a horizontal or a vertical direction (S610).

Based on the determination of operation S610, when the surrounding skeleton point neighbors the central skeleton point in the horizontal or the vertical direction, in the determining the branch points (S320) of FIG. 3, the branch point determiner (120 of FIG. 1) determines that the surrounding skeleton point as a first neighbor skeleton point of the central skeleton point (S611).

Based on the determination of operation S610, when the surrounding skeleton point does not neighbor the central skeleton point in the horizontal or the vertical direction, in the determining the branch points (S320) of FIG. 3, the branch point determiner (120 of FIG. 1) determines whether the surrounding skeleton point neighbors the first neighbor skeleton point in the horizontal or the vertical direction (S620).

Based on the determination of operation S620, when the surrounding skeleton point does not neighbor the first neighbor skeleton point in the horizontal or the vertical direction, in the determining the branch points (S320) of FIG. 3, the branch point determiner (120 of FIG. 1) determines whether the surrounding skeleton point neighbors the central skeleton point in a diagonal direction (S630).

Based on the determination of operation S630, when the surrounding skeleton point neighbors the central skeleton point in the diagonal direction, in the determining the branch points (S320) of FIG. 3, the branch point determiner (120 of FIG. 1) determines that the surrounding skeleton point is a second neighbor skeleton point of the central skeleton point (S631).

When the surrounding skeleton point neighbors the first neighbor skeleton point in the horizontal or the vertical direction based on the determination of operation S620 or when the surrounding skeleton point does not neighbor the central skeleton point in the diagonal direction based on the determination of operation S630, in the determining the branch points (S320) of FIG. 3, the branch point determiner (120 of FIG. 1) determines that the surrounding skeleton point is not a neighbor skeleton point of the central skeleton point (not shown).

After determining the neighbor skeleton point condition by performing operations S610, S620, and S630, in the determining the branch points (S320) of FIG. 3, the branch point determiner (120 of FIG. 1) determines whether the central skeleton point has three or more neighbor skeleton points (S640).

Based on the determination of operation S640, when the central skeleton point has three or more neighbor skeleton points, in the determining the branch points (S320) of FIG. 3, the branch point determiner (120 of FIG. 1) determines that the central skeleton point is a branch point (S641).

Based on the determination of operation S640, when the central skeleton point does not have three or more neighbor skeleton points, in the determining the branch points (S320) of FIG. 3, the branch point determiner (120 of FIG. 1) determines that the central skeleton point is not a branch point.

The branch point determiner (120 of FIG. 1) may determine the central skeleton point as a normal point when the central skeleton point has two neighbor skeleton points, and determine the central skeleton point as an end point when there is one neighbor skeleton point (S642).

Figure 7:
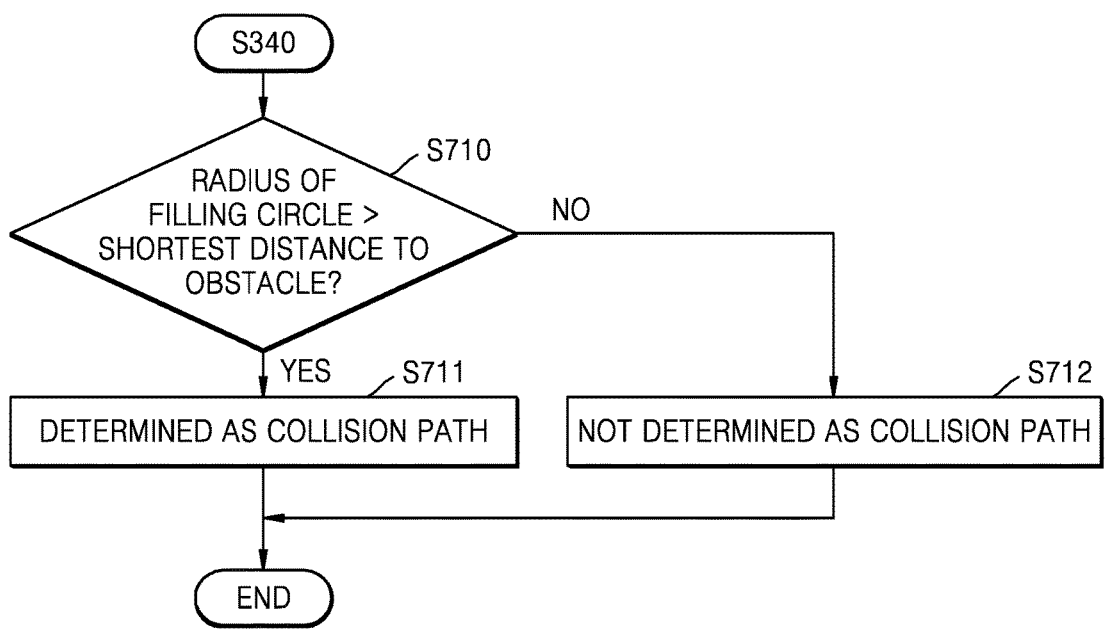
FIG. 7 is an exemplary flowchart for determining of a collision path of FIG. 3.

FIG. 7 is an exemplary flowchart of the determining the collision path (S350) of FIG. 3.

Referring to FIG. 7, the determining the collision path (S350) of FIG. 3 includes operation S710 of determining whether an object moving path is a collision path by using a radius of a filling circle, performed by the collision path determiner (150 of FIG. 1).

In the determining the collision path (S350) of FIG. 3, for each of target points, the collision path determiner (150 of FIG. 1) determines whether a radius of a filling circle corresponding to each of the target points is greater than the shortest distance between the each of the target points and the obstacle (S710).

In this case, the radius corresponding to the target point may be equal to the shortest distance between the boundary of the path area and the target point.

Based on the determination of operation S710, when there is at least one radius of the filling circle corresponding to the target point greater than the shortest distance between the target point and the obstacle, in the determining the collision path (S350) of FIG. 3, the collision path determiner (150 of FIG. 1) may determine that the object moving path is the collision path (S711).

Based on the determination of operation S710, when there is no radius of the filling circle corresponding to the target point greater than the shortest distance between the target point and the obstacle, in the determining the collision path (S350) of FIG. 3, the collision path determiner (150 of FIG. 1) may determine that the object moving path is not the collision path (S712).

According to an exemplary embodiment, based on the determination of operation S710, when there is no radius of the filling circle corresponding to the target point greater than the shortest distance between the target point and the obstacle, in the determining the collision path (S350) of FIG. 3, the collision path determiner (150 of FIG. 1) may calculate a distance for each of the target points by subtracting the radius of the filling circle corresponding to the target point from the shortest distance between the target point and the obstacle, and determine the shortest calculated distance as a distance from the object to the obstacle on the object moving path.

The distance from the object to the obstacle on the object moving path may be utilized as an evaluation index of the object moving path.

Figure 8:
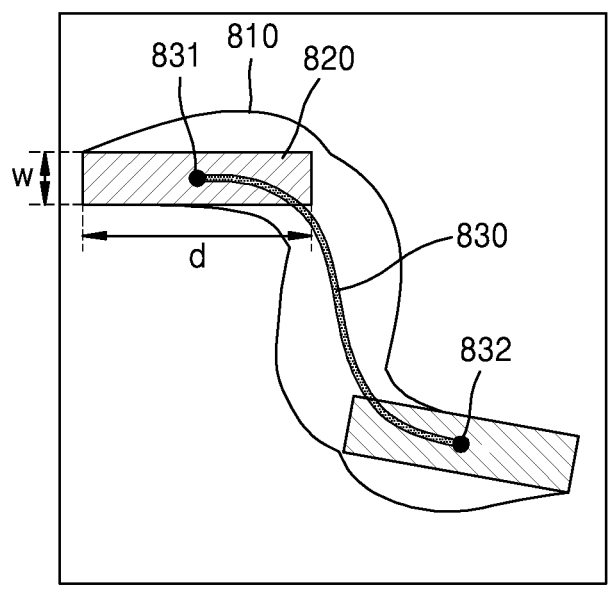
FIG. 8 is a diagram of an object moving path, according to an exemplary embodiment.

FIG. 8 is a diagram of an object moving path 810, according to an exemplary embodiment.

Referring to FIG. 8, the object moving path 810 according to an exemplary embodiment shows a path that the object 820 moves on a 2-dimensional (2D) plane.

The object moving path 810 may be a course that the object 820 passes as the center of the object 820 moves from a starting point 831 to a finish point 832 along a central line 830.

In this case, since the object 820 has a width w and a length d, a thickness of the object moving path 810 may be greater than the width w of the object 820.

FIGS. 9A to 9I are diagrams for describing a method of modeling an object moving path, according to exemplary embodiments.

Figure 9C:
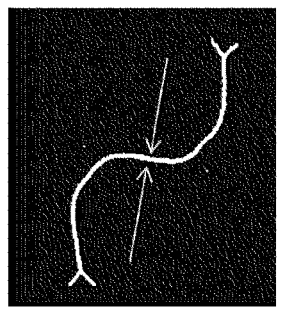
FIGS. 9A to 9I are diagrams for describing a method of modeling an object moving path, according to exemplary embodiments.
Figure 9B:
Figure 9A:
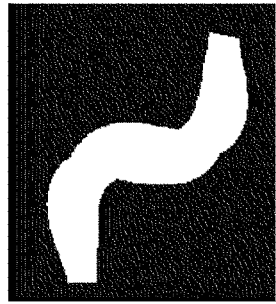
Figure 9F:
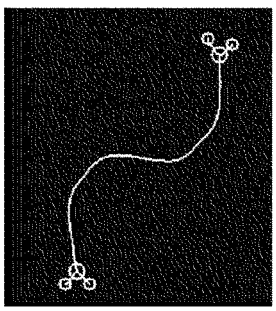
Figure 9E:
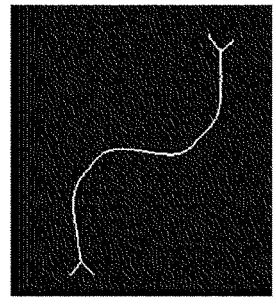
Figure 9D:
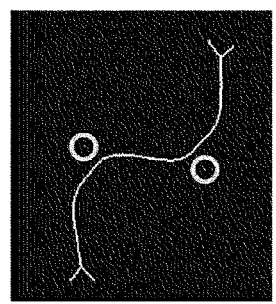
Figure 9I:
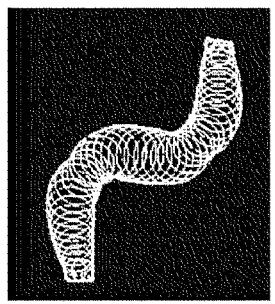
Figure 9H:
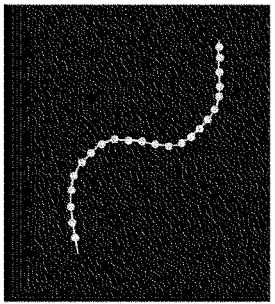
Figure 9G:
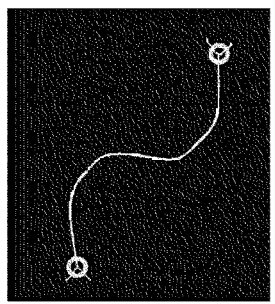

Referring to FIGS. 9A to 9I, the method according to an exemplary embodiment includes performing Euclidean distance transforming (FIG. 9B) on an object moving path (FIG. 9A), detecting feature points from a Euclidean distance transformation result (FIG. 9C), thinning the detected feature points (FIG. 9D), acquiring largest connected points from among the thinned feature points as a topological skeleton (FIG. 9E), detecting branch points on the topological skeleton (FIG. 9F), extracting a branch with the maximum length by using the branch points (FIG. 9G), selecting target points from among points forming the branch (FIG. 9H), and creating filling circles for each of the target points (FIG. 9I). Thus, the object moving path is modeled.

Figure 10:
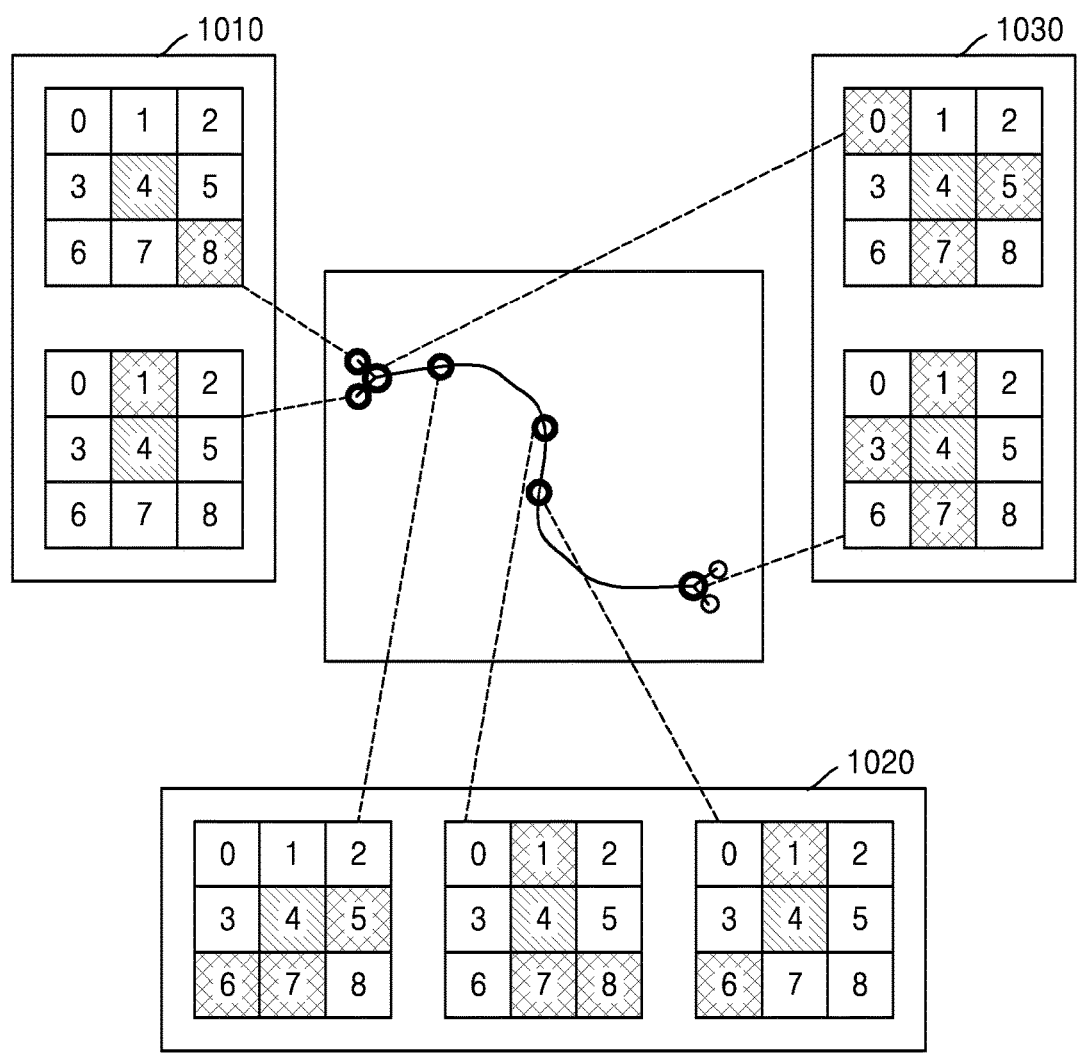
FIG. 10 is a diagram of a method of determining a branch point, according to an embodiment.

FIG. 10 is a diagram of a method of determining a branch point, according to an exemplary embodiment.

Referring to FIG. 10, the method according to an exemplary embodiment includes using neighboring directions to determine a branch point 1030 from among points that form a topological skeleton corresponding to a path area.

First, suppose that a point from among the points forming the topological skeleton is referred to as a central point, and points that neighbor the central point are referred to as surrounding points. One central point and one surrounding point may be neighbors in eight directions. For example, one central point may have one surrounding point in any of two horizontal directions, two vertical directions, and four diagonal directions. As shown in FIG. 10, when the central point is a point corresponding to the number 4, the surrounding points may be points corresponding to numbers 0 to 3 and 5 to 8.

In this case, the branch point determiner (120 of FIG. 1) may determine that the central point is one of an end point 1010, a normal point 1020, and the branch point 1030, depending on the number of neighboring points that neighbor the central point.

For example, when there is one neighboring point, the branch point determiner (120 of FIG. 1) may determine the central point as the end point 1010. When there are two neighboring points, the branch point determiner (120 of FIG. 1) may determine the central point as the normal point 1020. When there are three or more neighboring points, the branch point determiner (120 of FIG. 1) may determine the central point as the branch point 1030.

Even when any one of the surrounding points neighbor the central point, when that surrounding point is neighbors another surrounding point in a horizontal or vertical direction, the branch point determiner (120 of FIG. 1) may determine that the surrounding point neighboring the central point is not a neighboring point. For example, when the points corresponding to 5, 6 and 7 neighbor the point corresponding to 4, the point corresponding to 6 is neighboring the point corresponding to 7 in a horizontal direction. Therefore, the branch point determiner (120 of FIG. 1) may determine that the point corresponding to 6 is not a neighboring point. In this case, the branch point determiner (120 of FIG. 1) may determine that only the points corresponding to 5 and 7 are neighboring points, and determine the point corresponding to 4 as the normal point 1020 because the point corresponding to 4 has two neighboring points.

Figure 11A:
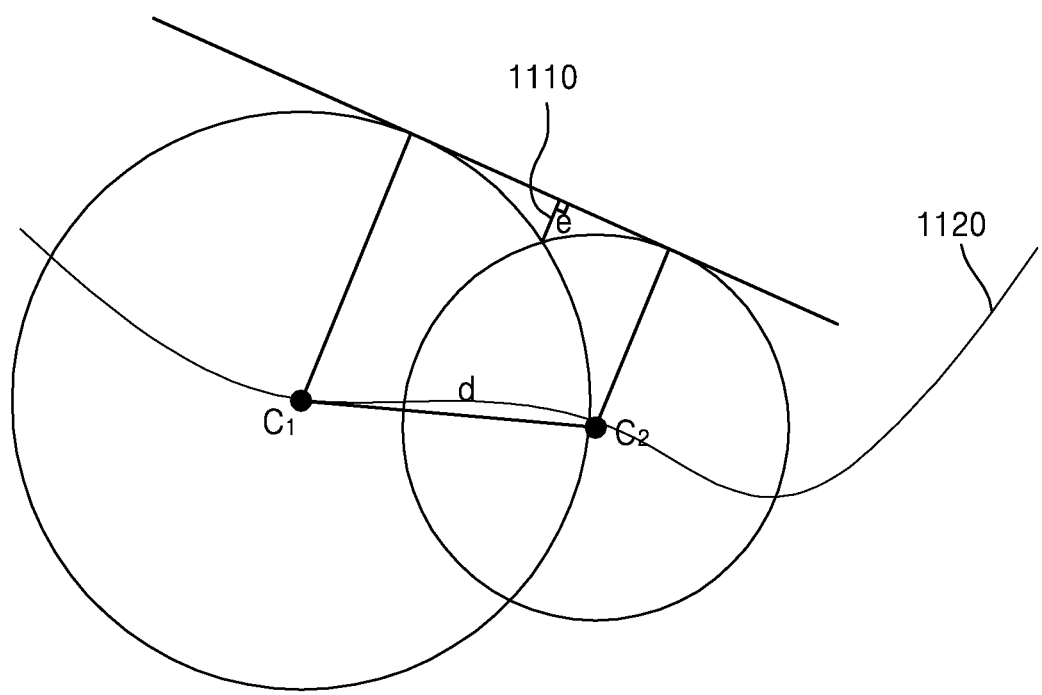
FIGS. 11A and 11B are diagrams for describing a method of calculating an error value, according to exemplary embodiments.
Figure 11B:
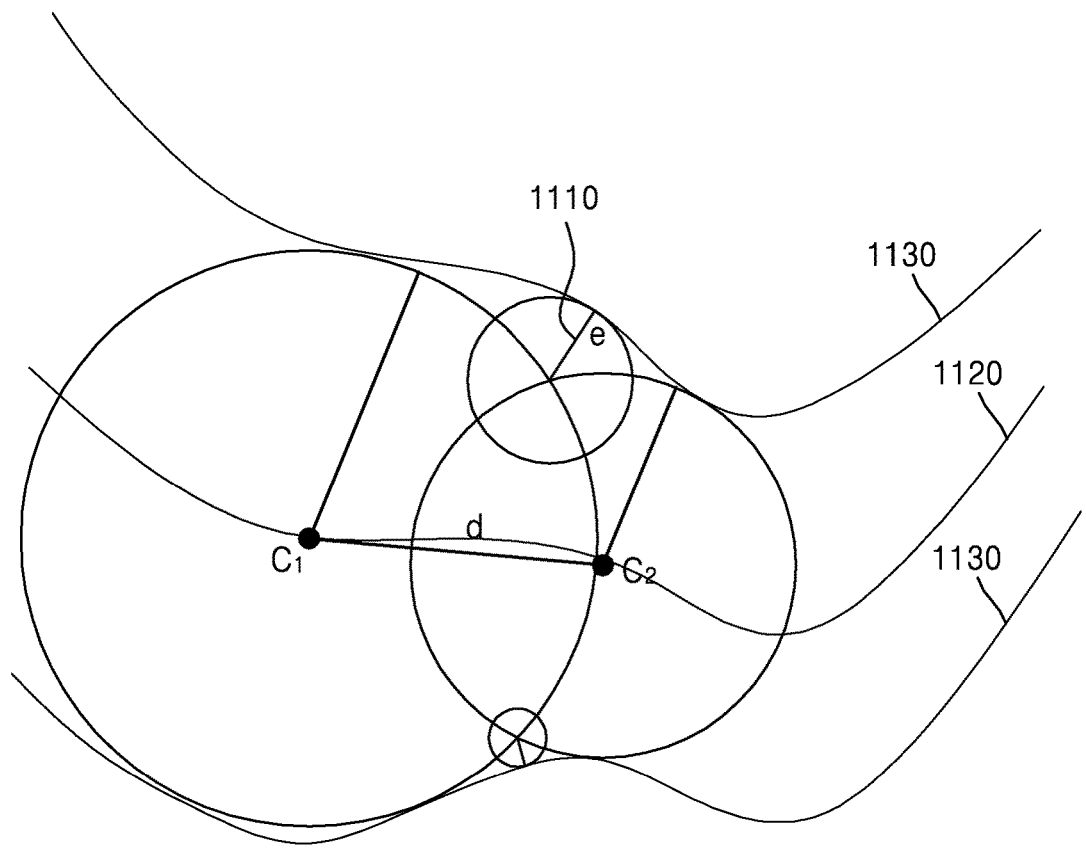

FIGS. 11A and 11B are diagrams for describing a method of calculating an error value, according to exemplary embodiments.

Referring to FIGS. 11A and 11B, an error value 1110 is calculated based on intersections of two filling circles created with respect to two target points C1 and C2 arranged on a topological skeleton 1120.

In an exemplary embodiment, as shown in FIG. 11A, the error value calculator (220 of FIG. 2) may calculate distances between a line that simultaneously contacts the two filling circles and the intersections of the two filling circles as the error value 1110.

In another exemplary embodiment, as shown in FIG. 11B the error value calculator (220 of FIG. 2) may calculate the greatest value from among the shortest distances between a boundary 1130 of a path area and the intersections of the two filling circles as the error value 1110.

According to such method, the error value 110 may be adjusted by modifying a distance between the target points C1 and C2 on the topological skeleton 1120.

For example, when the distance between the target points C1 and C2 on the topological skeleton 1120 increases, the intersections of the two filling circles created with respect to the target points C1 and C2 may be located closer to the topological skeleton 1120, which thus may lead to an increase in the error value 1110.

Although not shown in FIGS. 11A and 11B, according to another exemplary embodiment, the error value calculator (220 of FIG. 2) may calculate a size of a portion of the path area which is not filled with filling circles as an error value.

Figure 12:
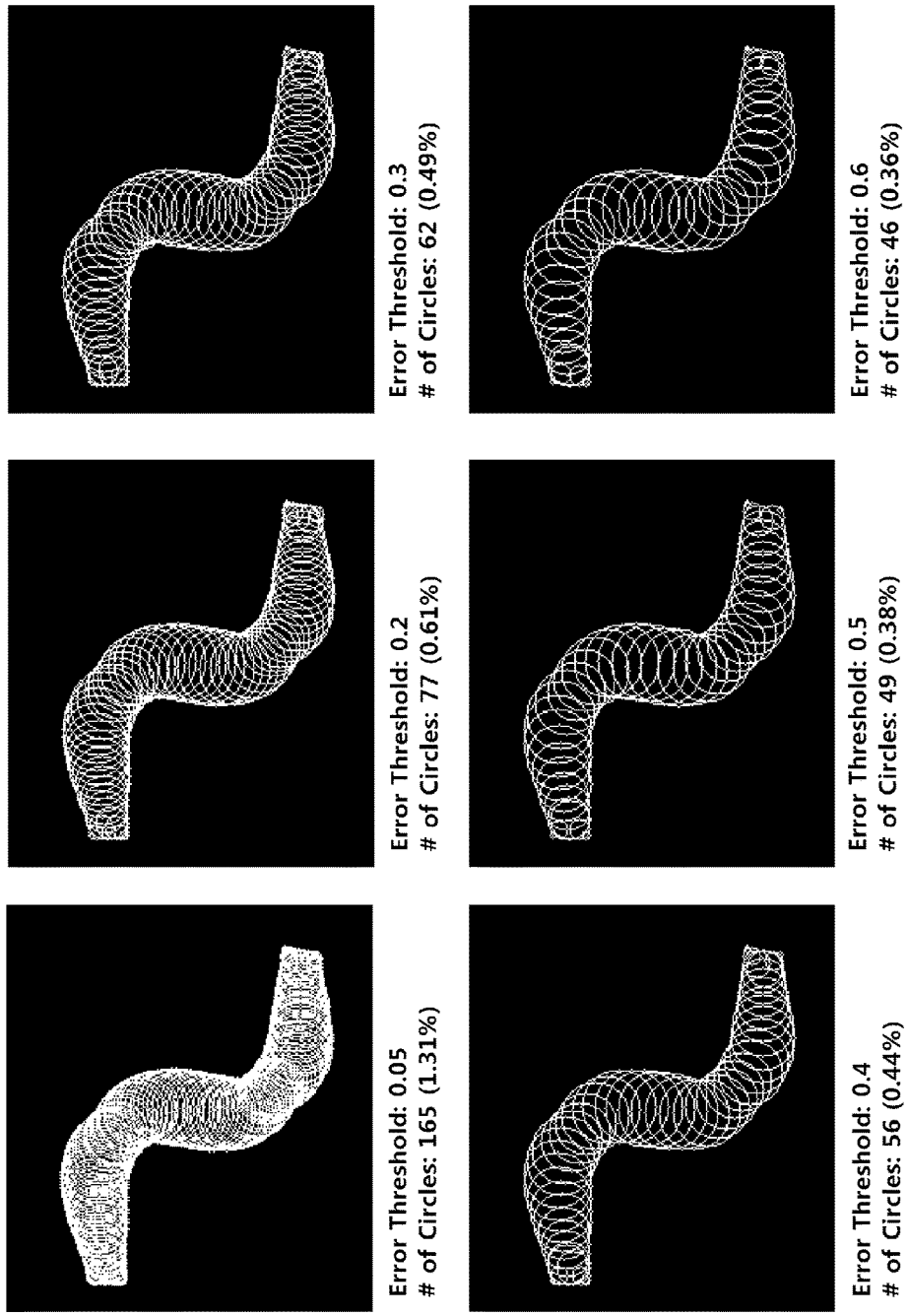
FIG. 12 is a relationship between an error threshold and a number of filling circles, according to an exemplary embodiment.

FIG. 12 is a relationship between an error threshold and the number of filling circles, according to an exemplary embodiment.

Referring to FIG. 12, as an error threshold increases, the number (#) of filling circles may decrease.

That is, when an error threshold increases, a distance between target points arranged on a topological skeleton corresponding to a path area may increase, and thus the number of filling circles created on each of the target points may decrease.

Accordingly, the method of determining the obstacle collision by using the object moving path according to an exemplary embodiment may be used to increase modeling error and decrease the number of filling circles, thus reducing an amount of operations or calculation necessary or required for determining obstacle collision.

The method and apparatus according to the above exemplary embodiments may be used to determine obstacle collision by using topological skeleton points of a path area, and thus operations or calculations necessary or required for determining obstacle collision may be reduced in comparison to when using all points in the path area.

Based on an error value set according to the method and apparatus according to the above exemplary embodiments, some points may be selected from the topological skeleton to model the path area, and the obstacle collision may be determined by using the modeled path area. Accordingly, modeling error and operation reduction effects according to the modeling error may be adjusted.

The aforementioned embodiments may be implemented through program instructions that are executable via various computer devices and recorded in computer-readable recording media. Examples of the computer-readable recording media include magnetic media (e.g., hard disks, floppy disks, or magnetic tapes), optical media (e.g., CD-ROMs or DVDs), magneto-optical media (e.g., floptical disks), and hardware devices specifically designed to store and execute the program instructions (e.g., ROM or RAM). Furthermore, the computer-readable recording media may include intangible media that are transmittable via networks, for example, software or applications that may be transmitted and distributed over networks.

The program instructions recorded on the media may be those specially designed and constructed, or they may be of the kind well-known and available to those of ordinary skill in the computer software arts. Examples of the program instructions not only include machine codes that are made by compilers but also computer-executable high level language codes that may be executed by using an interpreter.

The particular implementations shown and described herein are illustrative examples of the embodiments and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of embodiments unless the element is specifically described as "essential" or "critical."

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of determining obstacle collision by using an object moving path, the method comprising:
    acquiring a topological skeleton corresponding to a path area on an image comprising a moving path of an object and an obstacle;
    determining, from among skeleton points forming the topological skeleton, branch points that are interconnecting points between branches of the topological skeleton;
    determining a target branch from among the branches by using the branch points;
    selecting, from among points forming the target branch, a plurality of target points to determine whether the moving path is a collision path of the object; and
    determining whether the moving path is the collision path by using the target points, and
    generating an evaluation index based on the determined collision path.

2. The method of claim 1, wherein the selecting the target points comprises:
    creating a filling circle for each of the target points, the filling circle having the each of the target points as a center and a shortest distance between a boundary of the path area and the each of the target points as a radius;

calculating error values for the each of the target points by using the filling circles; and selecting target points such that the error value is less than a preset error threshold.

3. The method of claim 2, wherein the calculating the error values comprises acquiring, for each pair of the target points that do not have another target point in between, two intersections between two filling circles corresponding to the each pair of the target points and two lines that contact the two filling circles, and calculating the error values based on a least value from among distances between the intersections and the lines.

4. The method of claim 2, wherein the calculating the error values comprises acquiring, for each pair of the target points that do not have another target point in between, two intersections between two filling circles corresponding to the each pair of the target points, and calculating the error values based on a greatest value from among shortest distances between the boundary of the path area and the intersections.

5. The method of claim 2, wherein the calculating the error values comprises calculating the error values based on a number of points in a portion of the path area which does not overlap the filling circles.

6. The method of claim 2, wherein the creating the filling circle comprises acquiring a shortest distance between the boundary of the path area and the each of the target points based on a value obtained by Euclidean distance transforming the image based on the boundary of the path area.

7. The method of claim 1, wherein the determining whether the moving path is the collision path comprises determining whether the moving path is the collision path by comparing, for each of the target points, a shortest distance between a boundary of the path area and the each of the target points with a shortest distance between a boundary of the obstacle and the each of the target points.

8. The method of claim 7, wherein the moving path is determined as the collision path when there is a target point with respect to which the shortest distance between the boundary of the path area and the target point is longer than the shortest distance between the boundary of the obstacle and the target point.

9. The method of claim 1, wherein the acquiring the topological skeleton comprises acquiring a first median by Euclidean distance transforming the image based on a boundary of the path area;

acquiring a second median by detecting feature points from the first median;

acquiring a third median by thinning feature points of the second median; and acquiring the topological skeleton by detecting largest connected points from among thinned points of the third median.

10. The method of claim 1, wherein the determining the branch points comprises:

determining, for each of the skeleton points, a neighboring skeleton point in a horizontal or vertical direction as a first neighbor skeleton point;

determining another skeleton point not neighboring the first neighbor skeleton point in the horizontal or vertical direction but neighboring the each of the skeleton points in a diagonal direction as a second neighbor skeleton point; and determining one of the skeleton points having three or more neighboring skeleton points as the branch point.

11. The method of claim 1, wherein the determining the target branch comprises determining, from among the branches, a branch formed of the greatest number of points as the target branch.

12. An apparatus for determining obstacle collision by using an object moving path, the apparatus comprising at least on hardware processor comprising:

a topological skeleton acquirer configured to acquire a topological skeleton corresponding to a path area in an image comprising a moving path of an object and an obstacle;

a branch point determiner configured to determine, from among skeleton points forming the topological skeleton, branch points that are interconnecting points between branches of the topological skeleton;

a target branch determiner configured to determine a target branch from among the branches by using the branch points;

a target point selector configured to select, from among points forming the target branch, a plurality of target points to determine whether the moving path is a collision path of the object; and a collision path determiner configured to determine whether the moving path is the collision path by using the target points and configured to generate an evaluation index based on the determined collision path.

13. The apparatus of claim 12, wherein the target point selector comprises:

a filling circle creator configured to create a filling circle for each of the target points, the filling circle having the each of the target points as a center and a shortest distance between a boundary of the path area and the each of the target points as a radius; and an error value calculator configured to calculate error values for the each of the target points by using the filling circles, wherein the target point selector selects target points such that the error value is less than a preset error threshold.

14. The apparatus of claim 13, wherein the error value calculator is configured to acquire, for each pair of the target points that do not have another target point in between, two intersections between two filling circles corresponding to the each pair of the target points and two lines that contact the two filling circles, and calculate the error values based on a least value from among distances between the intersections and the lines.

15. The apparatus of claim 13, wherein the filling circle creator is configured to acquire a shortest distance between the boundary of the path area and the each of the target points based on a value obtained by Euclidean distance transforming the image based on the boundary of the path area.

16. The apparatus of claim 12, wherein the collision path determiner is configured to determine whether the moving path is the collision path by comparing, for each of the target points, a shortest distance between a boundary of the path area and the each of the target points with a shortest distance between a boundary of the obstacle and the each of the target points.

17. The apparatus of claim 16, wherein the collision path determiner is configured to determine the moving path as the collision path when there is a target point along which the shortest distance between the boundary of the path area and the each of the target points is longer than the shortest distance between the boundary of the obstacle and the each of the target points.

18. The apparatus of claim 12, wherein the topological skeleton acquirer is configured to acquire a first median by Euclidean distance transforming the image based on a boundary of the path area, a second median by detecting feature points from the first median, a third median by thinning feature points of the second median, and the topological skeleton by detecting largest connected points from among thinned points of the third median.

19. The apparatus of claim 12, wherein the branch point determiner is configured to determine, for each of the skeleton points, a neighboring skeleton point a horizontal or vertical direction as a first neighbor skeleton point, determine another skeleton point not neighboring the first neighbor skeleton point in the horizontal or vertical direction but neighboring the each of the skeleton points in a diagonal direction as a second neighbor skeleton point, and determine one of the skeleton points having three or more neighboring skeleton points as the branch point.

20. The apparatus of claim 12, wherein the target branch determiner is configured to determine, from among the branches, a branch formed of the greatest number of points as the target branch.

* * * * *